US006994075B2

(12) United States Patent
Penschuck

(10) Patent No.: US 6,994,075 B2
(45) Date of Patent: Feb. 7, 2006

(54) METHOD FOR DETERMINING THE FUEL VAPOR PRESSURE IN A MOTOR VEHICLE WITH ON-BOARD MEANS

(75) Inventor: Juergen Penschuck, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/704,748

(22) Filed: Nov. 12, 2003

(65) Prior Publication Data

US 2004/0226543 A1 Nov. 18, 2004

(30) Foreign Application Priority Data

Nov. 11, 2002 (DE) ................................ 102 52 225

(51) Int. Cl.
*F02M 25/08* (2006.01)
*G06F 7/00* (2006.01)

(52) U.S. Cl. ........................................ 123/518; 701/29

(58) Field of Classification Search ............ 123/179.7, 123/491, 516–520, 198 D; 73/49.2, 49.3, 73/49.7, 52, 118.1; 701/29, 103, 104, 113, 701/114

See application file for complete search history.

(56) References Cited

U.S. PATENT DOCUMENTS

| | | | | |
|---|---|---|---|---|
| 4,528,963 | A * | 7/1985 | Bessho et al. | 123/491 |
| 5,044,341 | A | 9/1991 | Henning et al. | |
| 5,836,291 | A | 11/1998 | Kinugasa et al. | |
| 5,878,727 | A * | 3/1999 | Huls | 123/520 |
| 5,962,927 | A | 10/1999 | Inada et al. | |
| 6,435,164 | B1 * | 8/2002 | Kaiser et al. | 123/516 |
| 6,594,562 | B2 * | 7/2003 | Kaiser et al. | 701/29 |
| 2003/0037599 | A1 | 2/2003 | Penschuck et al. | 73/49.2 |

* cited by examiner

*Primary Examiner*—Willis R. Wolfe, Jr.
(74) *Attorney, Agent, or Firm*—Walter Ottesen

(57) ABSTRACT

A method determines the fuel vapor pressure in a fuel tank system of a motor vehicle. The fuel tank system includes a tank venting system and the fuel vapor pressure is determined from a temperature dependency of at least a characteristic variable of the tank venting system correlating indirectly to the inner pressure present in the fuel tank system.

11 Claims, 3 Drawing Sheets

METHOD FOR DETERMINING THE FUEL VAPOR PRESSURE IN A MOTOR VEHICLE WITH ON-BOARD MEANS

RELATED APPLICATION

This application claims priority of German patent application 102 52 225.1, filed Nov. 11, 2002, the entire content of which is incorporated herein by reference.

FIELD OF THE INVENTION

The invention relates to a method for determining the fuel vapor pressure in a fuel tank system of a motor vehicle.

BACKGROUND OF THE INVENTION

In areas other than motor vehicle technology, analysis-measuring apparatus are known with which the vapor pressure of fuel can be determined under laboratory conditions. Methods of this kind are the vapor pressure determination according to Reid as set forth in DIN 51754/ASTM D 323 and the vapor pressure determination according to Grabner as set forth in DIN 51439.

The method of Reid proceeds from a vapor pressure curve wherein the fuel vapor pressure is plotted double-logarithmically (log—log) against the fuel temperature. In this plot, parallelly displaced linear curves result for different fuel qualities or fuel types. The method functions to determine, in advance, the rated pressure, which results when storing fuel in a vessel, and therewith determines the required pressure tightness of the vessel.

In the Reid method, first the maximum surface temperature of the fuel is determined which results during the storing operation. The corresponding vertically arranged temperature line in the above-mentioned Reid diagram intersects the Reid vapor pressure line of the particular fuel at a specific point. From the curve, the initial vapor pressure is determined via horizontal extrapolation starting from the above-mentioned intersect point. The value 14.7 is subtracted from this start value and this yields the above-mentioned required rated pressure of the vessel for storing fuel without vapor losses.

In contrast to the above, the method of Grabner is based on double-linearly plotted vapor pressure curves. Otherwise, however, one proceeds as in the Reid method so that the Grabner method is not explained further here.

The above-described known analysis apparatus and methods are little suited for the use in motor vehicles because of the required measuring complexity and evaluation complexity. These methods are especially not suitable for determining the fuel vapor pressure in vehicle operation and especially not for doing this exclusively with existing vehicle on-board means.

SUMMARY OF THE INVENTION

Because of the above, it is an object of the invention to provide a method of the type described above which makes possible a determination of the fuel vapor pressure in a vehicle tank or vehicle tank system of a motor vehicle having a tank-venting system during the driving operation and/or exclusively with on-board means.

The method of the invention is for determining the fuel vapor pressure in a fuel tank system of a motor vehicle, the fuel tank system including a tank venting system. The method includes the step of determining the fuel vapor pressure from a temperature dependency of at least a characteristic variable of the tank venting system correlating indirectly to the inner pressure present in the fuel tank system.

The invention is based on the idea to determine the fuel vapor pressure indirectly via one or several characteristic variables of the tank-venting system which correlate only indirectly with the interior pressure of the tank or tank system. This thought is based on the realization that increased pressure values will adjust in the tank system because of fuel vaporization for a temperature, which is characteristic for the particular fuel, and pregiven outer or atmospheric pressure because of the instantaneous geographic elevation of the vehicle. These increased pressure values, in turn, effect a corresponding change of the above-mentioned characteristic quantity or quantities of the tank-venting system. In the computation of the fuel vapor pressure, preferably the fuel temperature and the outer or atmospheric pressure are considered which are either made available by an engine control apparatus or a temperature sensor or a pressure sensor.

In a preferred embodiment, the charge of a filter element of the tank-venting system (which operates together with the tank system) with fuel vapors originating from the tank system or tank is applied as a characteristic variable which correlates indirectly with the tank inner pressure. The charge value is especially determined via a charging factor "scavenging flow" provided in the engine control apparatus or control unit of the tank-venting system. With the above-mentioned temperature, which is characteristic for the particular fuel, and the given outer pressure, an increased value of this charging factor results. The fuel temperature value at which an increase of the charging value is measured, is characteristic for the particular fuel vapor pressure.

The invention thereby makes possible the detection of the outgassing of fuel in a tank or tank system of a motor vehicle and of the fuel vapor pressure, which is correlated to this outgassing, during driving operation of the vehicle and exclusively with vehicle on-board means.

Furthermore, it can be provided that, beginning with the engine start, the charging factor "scavenging flow" is detected from time to time or continuously and a trend analysis (for example, by means of a gradient method or filter method) is executed with respect to the method "time-dependent falling/time-dependent rising". From the result of this trend analysis, a conclusion can, in turn, be drawn indirectly as to the fuel vapor pressure.

In order to minimize the influence of short-term fluctuations of the fuel vapor pressure value, which is determined in the manner mentioned, a lowpass filtered charging value can be used as a basis for the computation of this fuel vapor pressure value.

The quality of the determined value for the fuel vapor pressure can be increased by a learning method. A change of the already learned value takes place when a value change of the above-mentioned charging factor "scavenging flow" adjusts.

In the learning method, it can be additionally provided to reject already learned values in a detected tanking operation. As mentioned initially, the vapor pressure, which results at a specific temperature and outer pressure, is dependent sensitively from the basic type of fuel which can vary after each tanking operation. Accordingly, one distinguishes, for example, between summer fuel and winter fuel.

A value of the fuel vapor pressure, which is determined in this manner, can be used as an additional input quantity in an engine control in order to undertake, for example, corrective interventions in the engine control for a more precise precontrol of an engine start function, an engine idle control, an engine knock control, an engine ignition control or for regenerating the fuel vapor filter of a tank-venting system.

Furthermore, corrective interventions in diagnostic functions are also made possible in a tank tightness check. Accordingly, an outgassing of fuel, which is detected during driving operation, can be timely applied ahead of the execution of a tank leak diagnosis for the purpose of correction and corrective interventions in the diagnosis, depending upon the value of the fuel vapor pressure then present, can be derived.

The method of the invention additionally makes possible a detection of the tanked fuel quality and fuel type exclusively based on quantities, which are already present in the engine control apparatus, and therewith makes possible a consideration of the detected fuel quality or type in the engine control.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
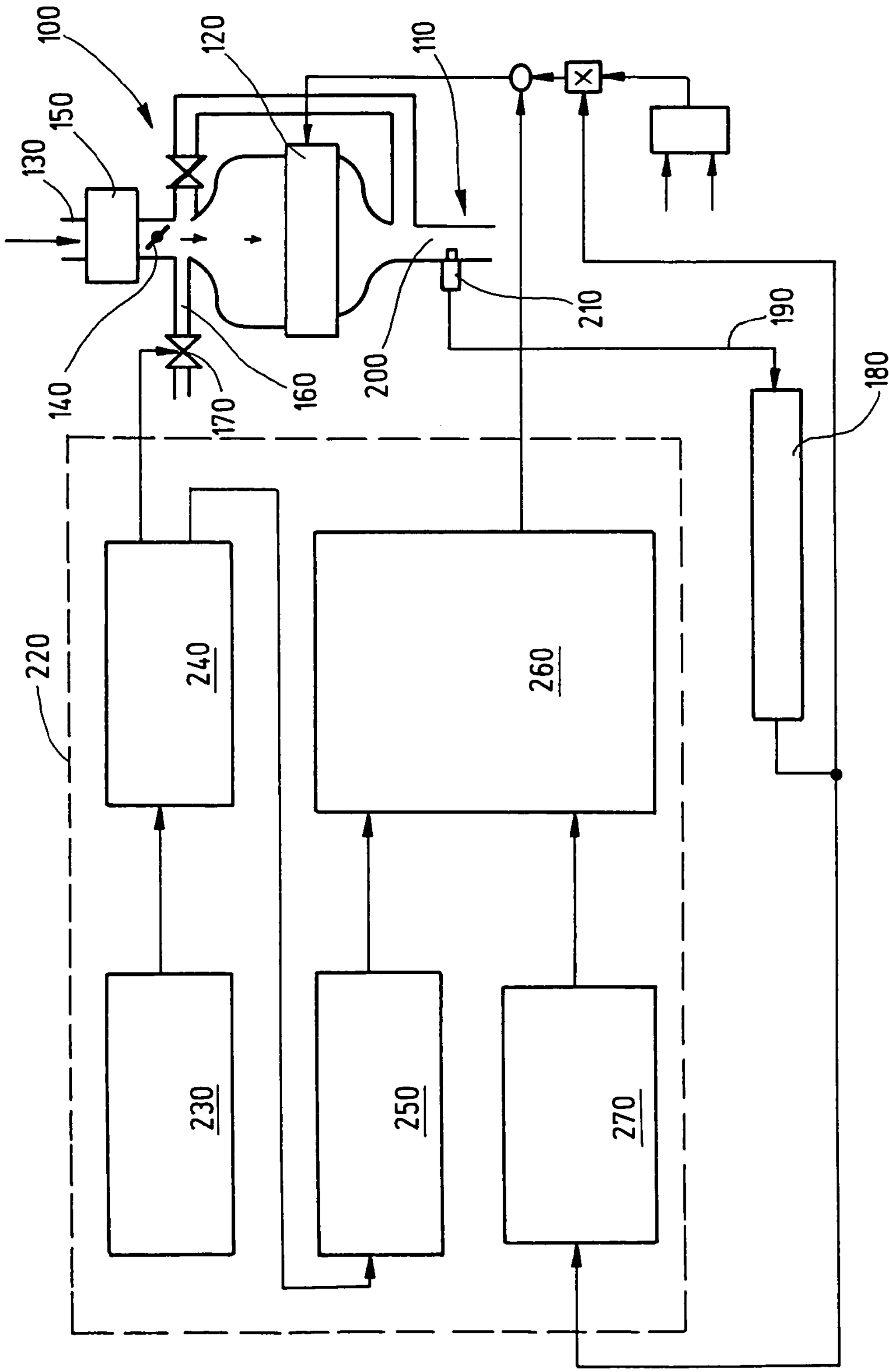
Fig.1a (PRIOR ART)
FIG. 1*a* is a schematic providing a function overview of a tank-venting system of a motor vehicle known from the state of the art.

FIG. 1*a* shows a function overview of a tank-venting system in a motor vehicle which is suitable for use of the method of the invention. The motor vehicle includes an injection engine 100 and a lambda-controlled exhaust-gas catalytic converter 110. An intake manifold 130 is connected to the combustion chamber 120 of the injection motor 100 and includes an air mass sensor (HFM) 150 disposed ahead of a throttle flap 140. Viewed in the induction direction shown by the arrow, the intake manifold 130 branches behind the throttle flap 140, inter alia, into a tank-venting line 160, which is connected to a tank system (not shown). The tank-venting line 160 can be blocked by means of a tank-venting valve (TEV) 170. For tank venting, the TEV 170 is opened in a manner known per se in order to supply the venting vapor or venting gas (scavenging flow) to the intake manifold 130 and thereby to again use the same via the injection motor 100. The venting vapor or venting gas originates from the tank system (not shown) or from an adsorption filter (not shown).

The injection engine 100 further includes a known lambda controller 180 whose input quantity 190 is supplied by a lambda probe 210 mounted in the exhaust-gas system 200 of the injection engine 100.

Individual computation modules 230 to 270 for driving the tank-venting system are shown in the region 220 surrounded by the broken line. A first computation module 230 functions for computing the desired scavenging flow "mstedes" in order, for example, to make possible from time to time a liberation of the tank or tank-venting system of fuel vapor or a desorption of the mentioned adsorption filter in a manner known per se. The magnitude of the scavenging flow is adjusted in a manner known per se by controlling the TEV 170 at a specific pulse duty factor. A second computation module 240 therefore computes and outputs the needed pulse duty factor "tateout".

The second computation module 240 supplies additionally the value "tateact" of the actually resulting pulse duty factor from which a third computation module 250 computes the instantaneous scavenging flow "mste". This value is supplied to a fourth computation module 260 for computing the injection correction "rkte" which is required because of the scavenging current conducted into the intake manifold. The so-called charging factor "scavenging flow (ftead)" goes into this computation as a further quantity. The charging factor is supplied by a fifth computation module 270 whose computations are based on a tank model and a model for the adsorption filter (in most cases, an active charcoal filter). This charging factor functions as a starting point for the computation of the fuel vapor pressure as will be described in detail with respect to FIG. 2 hereinafter. It is understood that the above-described computation modules can be combined in a single physical computation module.

Figure 1B:
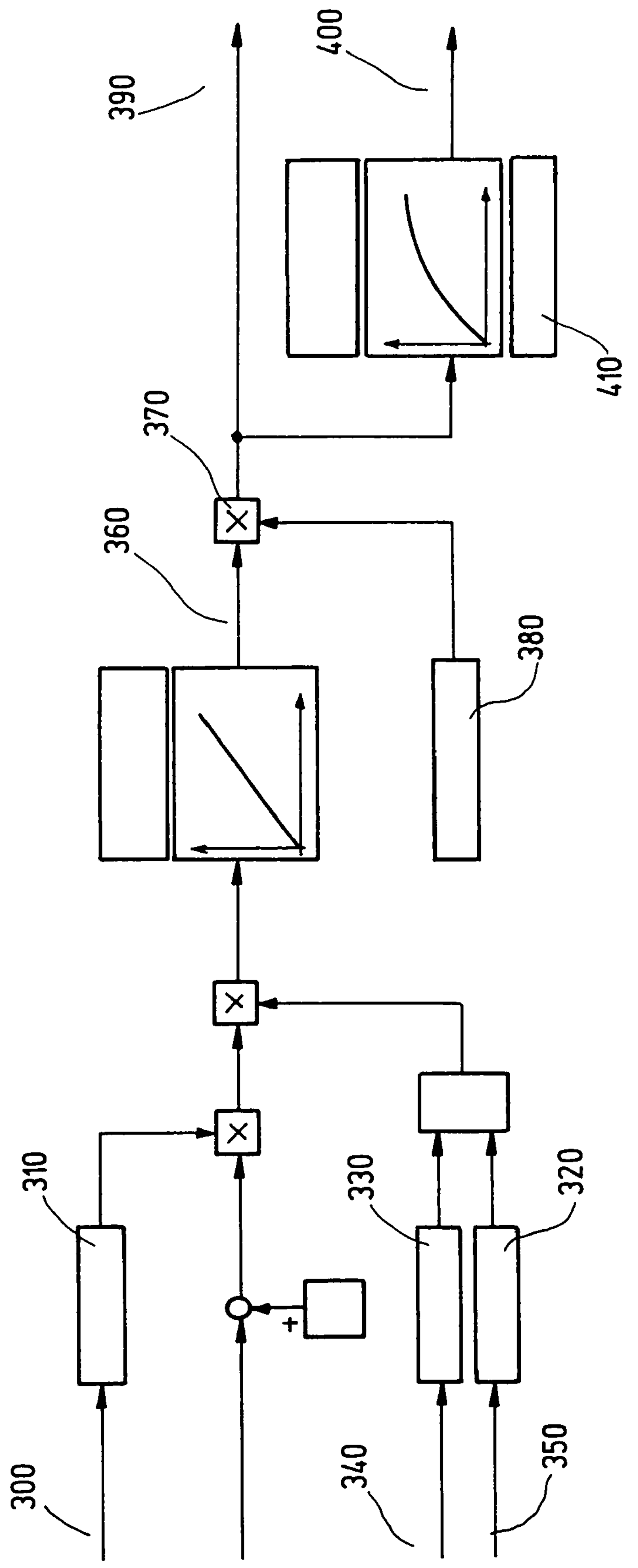
Fig.1b (PRIOR ART)
FIG. 1*b* is a circuit arrangement for computing the fuel vapor charge of a fuel vapor filter of a tank-venting system in a motor vehicle having intake manifold injection in accordance with the state of the art.

FIG. 1*b* shows a circuit arrangement for computing the above-mentioned charging factor (ftead) which is related to the HC concentration of the regeneration gas flow (charge) as will be explained in greater detail hereinafter. The HC concentration is computed from the integral of the deviations of the mean value frmit_w of the lambda control factors frm and frm2. The integration speed is dependent upon the following: the input quantity air mass flow ml 300 and the integration speed ZBTEML 310 for computing the charging factor and a value of the characteristic lines FBTEB 320 and FBTEVA 330 which is determined from a minimum selection. The factors ftefva 340 and ftefvab 350 are the basis of the characteristic lines FBTEB 320 and FBTEVA 330. The factor ftefva 340 is the scavenging rate of the tank venting and the factor ftefvab 350 is a limiting value of the scavenging rate for tank venting. These factors ftefva 340 and ftefvab 350 function to limit the learning speed for the charging computation. The characteristic line FBTEB 320 functions especially for reducing the integration speed in the limiting to relatively small scavenging rates. Furthermore, the characteristic line FBTEVA 330 functions to avoid an oscillation tendency of the lambda control factors fr or frm. The resulting parameter khc_w 360 represents the adapted HC concentration or the charge.

The charge ftead_w 390 is computed from the HC concentration after multiplication 370 by a factor FUMRBRK 380 for converting the HC concentration into a charging value ftead. The factor FUMRBRK has here the numerical value 30 and results from the product of the stoichiometric ratio for lambda=1 and the quotient of HC vapor pressure p_HC to air pressure p_air. The additional lowpass filtered value fteadf 400 makes possible a suppression of short-time fluctuations of ftead_w and is outputted especially by means of two time constants ZKFTEAD 410 for increasing behavior or falling behavior of the determined value of ftead.

Figure 2:
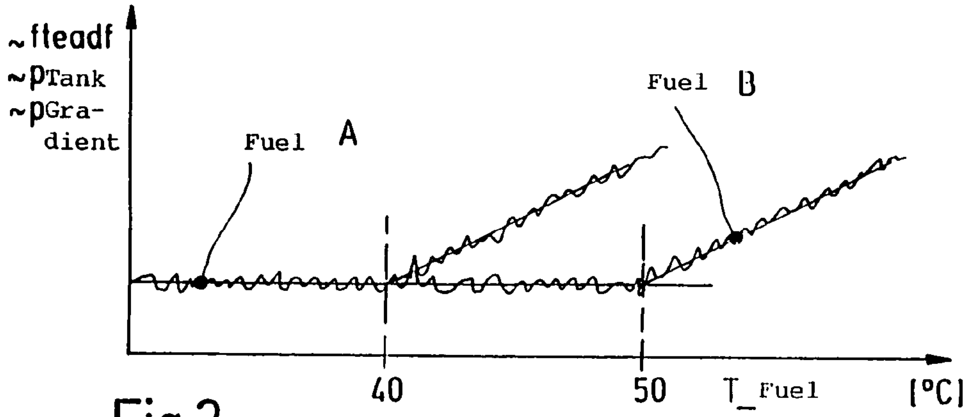
FIG. 2 shows the typical course of a method for determining the fuel vapor pressure in accordance with the invention based on a characteristic quantity diagram; and, FIG. 3 is a preferred embodiment of the method of the invention for determining the fuel vapor pressure based on a flowchart.

In FIG. 2, typical time-dependent courses of characteristic variables of the tank-venting system are shown for two different types of fuel. The characteristic variables are suitable for the determination of the fuel vapor pressure. The basis for the shown behavior of the characteristic variables is the known recognition that the vapor pressure of an ideally assumed liquid surface (for example, of a fuel), is dependent upon the material characteristics of the liquid itself and changes with the temperature of the liquid as well as with the ambient pressure in accordance with the relationship:

$$P\_\text{Vapor}\_\text{Fuel}=f(T\_\text{Fuel},\ p\_\text{Ambient}) \tag{1}$$

For a temperature, which is characteristic for the fuel, and known ambient pressure, which is essentially pregiven by the geographic elevation of the vehicle, increased vapor pressure values adjust in the tank because of fuel outgassing in the tank. The temperature at which a pressure change or a pressure gradient greater than zero occurs is therefore characteristic for the particular fuel vapor pressure. The corresponding kink points of the vapor pressure curves are shown in FIG. 2. The fuel temperature, which goes into this vapor pressure model, and the geographic elevation of the instantaneous location of the motor vehicle (and therefore the value for the atmospheric pressure or ambient pressure) are mostly already available in the control apparatus of the injection motor and therefore must not be first otherwise determined.

According to the preferred embodiment of the invention, the determination of the fuel vapor pressure takes place via a charging factor "scavenging flow (ftead)" which is made available in the tank-venting system. The lowpass filtered value (fteadf) of the charging factor is the basis for this determination. At a temperature, which is characteristic for the particular fuel, and the known atmospheric pressure, increased ftead values result. The start (beginning with which a value increase of fteadf is measured) is assumed as characteristic for the particular fuel vapor pressure.

The detection of the mentioned vapor pressure increase in the tank or tank system takes place in the embodiment in a motor operating phase "mixture adaptation" with the TEV closed, preferably via measurement, which is executed on statistical grounds many times, during driving or at vehicle standstill. The start of the value increase of the tank inner pressure is, in turn, assumed to be characteristic for the particular fuel vapor pressure.

In a further embodiment, the value of fteadf is observed after the engine start and trend statements are made as to whether fteadf increases or falls either by recognizing gradients or by means of suitable filters. One such filtering takes place preferably at different intensities depending on whether the value of ftead increases or falls. In this way, a weak filter is used with an increasing charging factor and a strong filter is used with a falling value. Short term seldom occurring peak values (peaks) of ftead are suppressed or not considered by means of an increasingly weak designed filter. In contrast thereto, by means of a decreasingly strong designed filter, drive situations such as overrun operation of the injection engine 100 (which, depending upon application, lead to low ftead values) are considered. These low values would not correctly reflect the actual charge of the above-mentioned active charcoal filter with exhaust-gas particles. In addition, one proceeds from the situation that an increased charge reduces only relatively slowly which is compensated by a strong filter.

A conclusion as to the fuel vapor pressure is arrived at indirectly by observing the charging factor fteadf (so-called monitoring fteadf). Whether fuel outgassing is present or not is shown by the magnitude of the value fteadf. Disturbance quantities, for example, because of different driving operation, are suppressed by suitable filters.

The fuel temperature is, in most cases, already known from the engine control function "fuel temperature model (KTTM)". For this purpose, reference can be made to U.S. Pat. No. 6,829,555. If the above is not the case, a corresponding thermal element has to be additionally provided. Also, the atmospheric pressure is mostly available in the engine control apparatus. Alternatively, a corresponding pressure sensor can be provided.

As shown in FIG. 2, the charging factor "scavenging current (ftead)" is at a low level at first when the vehicle or tank system is cold. This is so because, under these conditions, no fuel outgassing or a low fuel vapor pressure is present. With increasing fuel temperature because of the driving operation, the fuel vapor pressure increases, and therefore also its outgassing rate, so that the pressure in the tank increases.

A once increased tank inner pressure changes only slightly at first or not at all after switching off the vehicle. For this reason, a once detected vapor pressure value (or the value fteadf, which is the basis of this vapor pressure value), is intermediately stored until the next engine start or when the vehicle is again utilized. During the operation of the vehicle, a continuous reduction of the increased vapor pressure value takes place because the excessive fuel vapor is drawn by suction from the tank during the engine operation. The reduction takes place preferably based on a linearly falling characteristic in dependence upon the operating hours of the vehicle.

After a warm start of the engine, the instantaneous value of fteadf is compared to the intermediately stored value of fteadf. From this comparison, additional conclusions can be drawn as to the fuel quality or fuel type and therefore as to the vapor pressure which can be expected at a specific temperature and ambient pressure. The kink points of the two curves fteadf=f(temperature, geographic elevation) shown in FIG. 2 are applied for detecting the fuel quality or the vapor pressure to be expected. In this way, and in accordance with this method, summer and winter fuels can be reliably detected and/or distinguished. Furthermore, qualities which are to be classified above, between or below these two fuel types are detected and/or distinguished.

Figure 3:
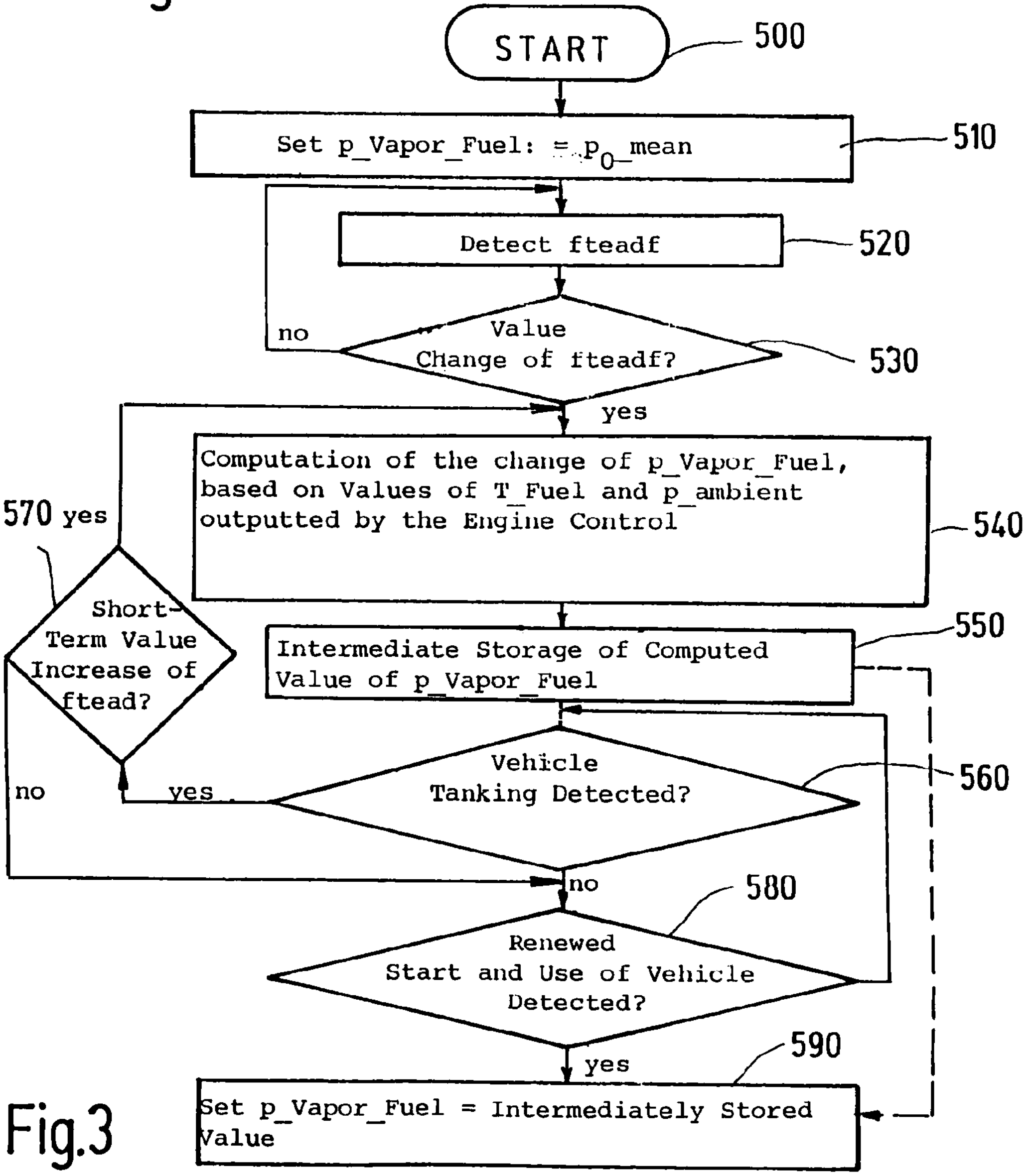

In a further embodiment illustrated by the flowchart of FIG. 3, the fuel vapor pressure is determined by means of a procedural learning process which is preferably based on the following learning strategy or following learning steps:

(a) after the start 500 of the learning routine shown, the instantaneous value of the fuel vapor pressure p_vapor_fuel is set equal to an initially empirically determined mean fuel vapor pressure $p_0$_means (510)

(b) learning of the vapor pressure in accordance with the described method; the instantaneous value of fteadf from the tank-venting system (520) is detected from time to time and it is checked (530) whether a change of the value is present; as soon as a value increase of fteadf adjusts, a correspondingly computed (540) change of the already learned value of p_vapor_fuel takes place;

(c) the value of p_vapor_fuel computed in (b) is intermediately stored (550) in order, for example, to be available for an assumption of the once-learned vapor pressure value at a new start of the vehicle engine or when taking the vehicle again into service (580);

(d) already learned vapor pressure values are rejected with a detected tanking (560) of the vehicle and the learning begins anew;

(e) after a detected tanking, the following two measures take place alternatively:

(f') if, after a tanking, a value increase of fteadf, for example, because of a relatively high temperature of the tanked fuel, has adjusted at (570), the magnitude of the fteadf values, in combination with the fuel temperature and the atmospheric pressure (geographic elevation), is assumed as a first index for the fuel vapor pressure (540);

(f") if, after tanking, no value increase of fteadf (for example, because of relatively low temperature of the tanked fuel) has adjusted, then the program continues without change of the value of p_vapor_fuel.

It is understood that the foregoing description is that of the preferred embodiments of the invention and that various changes and modifications may be made thereto without departing from the spirit and scope of the invention as defined in the appended claims.

What is claimed is:

1. A method for determining the fuel vapor pressure in a fuel tank system of a motor vehicle, the fuel tank system including a tank venting system, the method comprising the steps of:

determining the fuel vapor pressure from a temperature dependency of at least a characteristic variable of said tank venting system correlating indirectly to the inner pressure present in said fuel tank system; and, considering the fuel temperature and the ambient atmospheric pressure when determining said fuel vapor pressure.

2. The method of claim 1, wherein the determined fuel vapor pressure is used in an engine control of the motor vehicle.

3. The method of claim 1, wherein the determined fuel vapor pressure is used to undertake corrective interventions in the engine control for the more correct precontrol of an engine start function, an engine idle control, an engine knock control, an engine ignition control or to regenerate the fuel vapor filter of the tank venting system.

4. The method of claim 1, wherein corrective interventions in diagnostic functions of a tank leakage diagnosis system are undertaken by means of the specific fuel vapor pressure.

5. A method for determining the fuel vapor pressure in a fuel tank system of a motor vehicle, the fuel tank system including a tank venting system, the method comprising the steps of:

determining the fuel vapor pressure from a temperature dependency of at least a characteristic variable of said tank venting system correlating indirectly to the inner pressure present in said fuel tank system; and, applying the charge of a filter element of said tank venting system as said characteristic variable, the fuel vapors originating from said tank venting system and said tank venting system coacting with said fuel tank system.

6. The method of claim 5, comprising the further step of determining the value of said charge via a charging factor "scavenging flow" provided in the engine control apparatus or a control device of said tank venting system.

7. The method of claim 5, comprising the further step of assuming the fuel temperature value as characteristic for the fuel vapor pressure, said fuel temperature value being the temperature value at which an increase of the charging value is measured.

8. The method of claim 7, comprising the further step of, beginning with a start of said engine, detecting, continuously or intermittently, the charging factor "scavenging flow" and carrying out a trend analysis with respect to the time-dependent behavior and drawing a conclusion as to the fuel vapor pressure from the result of said trend analysis.

9. The method of claim 8, wherein a lowpass filtered value of the charging value forms a basis for said characteristic variable.

10. The method of claim 8, comprising the further step of determining the fuel vapor pressure with a learning method and wherein a change of a learned value takes place as soon as a value change of the charging factor "scavenging flow" occurs.

11. The method of claim 10, wherein a learned value is rejected for a detected tanking operation.

* * * * *